Sept. 10, 1968 D. J. VAN KIRK ET AL 3,400,699
PREHEATER UNIT FOR AN INTERNAL COMBUSTION ENGINE
Filed June 8, 1966
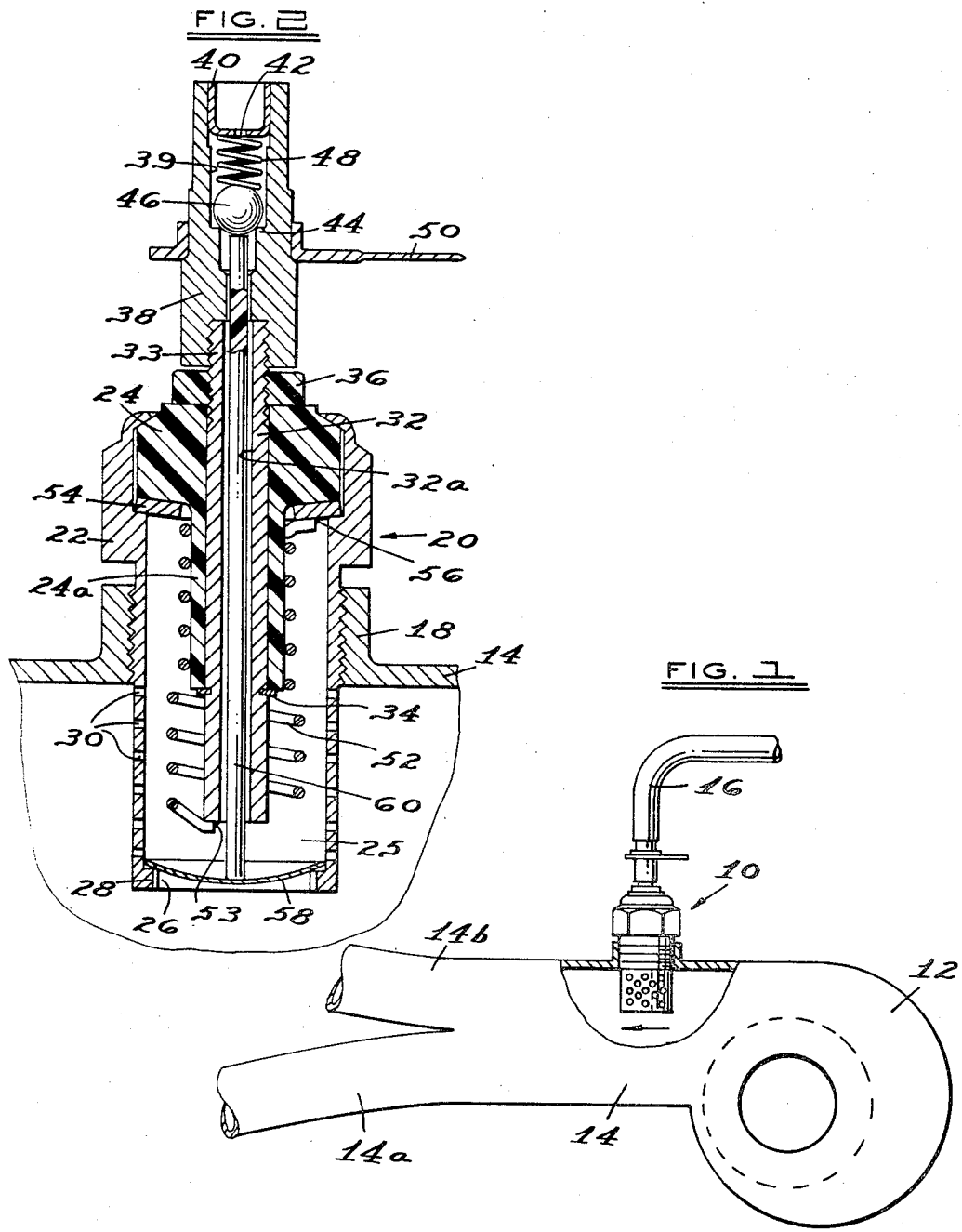
INVENTORS
DONALD J. VAN KIRK
CHARLES M. WELLS
BY
John R. Faulkner
Keith L. Zirschling
ATTORNEYS United States Patent Office 3,400,699
Patented Sept. 10, 1968

3,400,699
PREHEATER UNIT FOR AN INTERNAL
COMBUSTION ENGINE
Donald J. Van Kirk, Dearborn Heights, and Charles M. Wells, Livonia, Mich., assignors to Ford Motor Company, Dearborn, Mich., a corporation of Delaware
Filed June 8, 1966, Ser. No. 556,097
3 Claims. (Cl. 123—122)

ABSTRACT OF THE DISCLOSURE

An air intake preheater unit projecting into the air intake manifold of an internal combustion engine. The unit includes temperature responsive valve means operatively connected to a fuel head and an intermittently operable heating and fuel ignition element. Upon actuation of the heating and fuel ignition element, the valve means open to admit fuel to the unit for ignition. The heat generated by the burning of this fuel warms intake air to facilitate engine starting under cold climatic conditions.

---

This invention relates to a preheater unit for internal combustion engines and in particular to a preheater unit useful with diesel engines used in cold climates.

It is well known that diesel engines, employed under cold atmospheric temperatures, are difficult to start because they depend solely upon the heat generated by the compression of air to ignite the charge in the cylinder. When the intake air is too cold, the heat generated by the compression of such air is insufficient to ignite the air-fuel mixture. Consequently, it has been proposed to preheat the intake air before it is introduced to the cylinders of the engine during the period when the cold engine is being started.

It is, therefore, an object of this invention to provide a preheater system for internal combustion engines that will enable such engines to be started easily at low atmospheric temperatures.

A further object of this invention is to provide a preheater system of simple construction and reliability of operation.

An air intake preheater constructed in accordance with this invention includes housing means having an open end and a closed end and defining a partially closed combustion chamber. The open end of the housing extends into the air intake manifold of an internal combustion engine. Valve means are mounted adjacent the closed end of the housing and are operatively connected to a suitable source of fuel. A cylinder-like sleeve, having an internal bore communicating between the valve means and the combustion chamber, provides for the introduction of fuel into chamber. Control means operatively connect the valve means and a temperature responsive element carried by the open end of the combustion chamber so that temperature variations will cause the valve means to be opened and closed. A fuel ignition element is located in the combustion chamber to vaporize and ignite fuel introduced therein.

Further objects and advantages of this invention will become apparent when the following description is considered in connection with the accompanying drawings wherein:

FIGURE 1 is a schematic representation, partially in section, of an internal combustion air intake manifold in combination with an air intake preheater constructed in accordance with this invention and FIGURE 2 is an enlarged view, partially in section, of the air intake preheater unit illustrated in FIGURE 1.

Referring now in detail to the drawings, the numeral 10 denotes an air intake preheater unit mounted downstream from an air turbo-compressor 12 on engine intake manifold 14. Unit 10 is mounted upstream of the separation of manifold 14 into conduits 14a and 14b. Fuel line 16 connects unit 10 to a suitable source of fuel (not shown). A fuel head of from five to seven inches, for example, has proven acceptable for providing fuel to unit 10.

The air intake preheater unit 10, shown in detail in FIGURE 2, is mounted on an internally threaded collar 18 of manifold 14 and includes a housing 20 comprising a main body 22 and an insulator 24 that may be constructed of suitable ceramic material. Insulator 24 has integrally formed thereon sleeve 24a. It may thus be seen that housing 20 defines a combustion chamber 25 having an open end 26 surrounded by a shoulder 28 on main body 22. A plurality of apertures 30 are formed in that portion of main body 22 that extends into air intake manifold 14.

An electrically conductive sleeve 32 having a central bore 32a, extends longitudinally through insulator 24. Clip 34 secures sleeve 32 against movement relative to insulator 24. Threaded end 33 of sleeve 32 receives threaded spacer 36 and valve body 38 having a longitudinal internal bore 39.

An insert member 40, having an orifice 42 formed therethrough, is positioned in one end of bore 39. Shoulder 44, formed integral with valve body 38, protrudes into valve bore 39. A valve member 46, having a spherical shape, abuts shoulder 44 and is biased against shoulder 44 by means of a compression spring 48. An electrical terminal 50 is suitably secured to valve body 38, the latter being electrically conductive.

An electrical resistance heater element 52, in the shape of a coil, is located around insulator sleeve 24a and element 52 and is electrically connected to sleeve 32 by means of a solder joint 53 and is electrically connected to an electrically conductive washer 54 by means of a solder joint 56. Heater coil 52 may be made from any suitable electrical resistance alloy that will produce heat upon the passage of current therethrough. An example of a suitable alloy for coil 52 is the nickelchrome alloy "Nichrome."

Electrical current, causing the generation of heat in coil 52, is introduced to the preheater unit by means of terminal 50 and flows through valve body 38, sleeve 32 and joint 53 to coil 52. This current exits from coil 52 into washer 54, main body 22 and manifold 14. Manifold 14 is at ground potential.

A temperature responsive bimetallic disc 58 is mounted in aperture 26 of main body 22 by means of shoulder 28. A control rod 60, made of ceramic material or other suitable insulator, abuts disc 58 and extends through combustion chamber 25, bore 32a and valve bore 39. The end of rod 60 remote from bimetallic disc 58 abuts valve member 46.

In operation, when it is desired to cold start the internal combustion engine associated with preheater unit 10, the electric coil 52 is first actuated by the vehicle operator. Current may be introduced to coil 52 by closing a conventional switch (not shown) located in the vehicle passenger compartment, that closes a circuit including coil 52 and the vehicle battery. When the passage of current through coil 52 generates sufficient heat to raise the temperature of the environment of the preheater unit 10 to a predetermined level, bimetallic disc 58 will flex inwardly a distance sufficient to cause control rod 60 to move upward. This movement of control rod 60 forces valve member 46 to move against the force of spring 48 and away from shoulder 44. This movement of valve member 46 allows fuel to flow through orifice 42, valve bore 39 and sleeve bore 32a into combustion chamber 35. The fuel in combustion chamber 25 is vaporized and ignited due to the heat generated by coil 52.

The fuel burning in combustion chamber 25 produces hot gases and warms the air in manifold 14. After the preheater unit 10 has operated in this manner for a short time, the vehicle operator begins to start the engine by conventional methods. Compressed air from turbo-compressor 12, moving in the direction of the arrow shown in FIGURE 1, carries the preheated air and hot gases from manifold 14 through manifold portions 14a and 14b into the combustion chambers of the engine. The presence of these heated gases in the engine combustion chambers greatly aids in the cold starting of the engine.

After the engine has started, the vehicle operator opens the electric switch controlling the circuit that includes coil 52. The rush of cold air from turbo-compressor 12 through manifold 14 extinguishes combustion in chamber 25 and causes bimetallic disc 58 to return to its original position. Control rod 60 consequently moves in a downward direction and spring 48 forces valve member 46 against shoulder 44, thus terminating the further flow of fuel into chamber 25.

It may thus be seen that this invention provides an intake air preheater of simple design that is reliable in operation and economical to manufacture and install for aiding in the cold starting of an internal combustion engine.

It is to be understood that this invention is not limited to the exact construction shown and described above, but that various changes and modifications may be made without departing from the spirit and scope of the invention as set forth in the following claims.

We claim:
1. In an internal combustion engine having an air intake manifold, an air intake preheater including housing means having an open end and a closed end and defining a partially enclosed combustion chamber, said open end extending into said manifold, valve means mounted adjacent said closed end and operatively connected to a fuel source, a cylinder-like sleeve having an internal bore communicating between said valve means and said chamber, a temperature responsive disc-like bimetallic element mounted in the open end of said housing, and a control rod extending through said bore such that said rod has one of its ends abutting said bimetallic element and is operatively secured to said valve means to open and close said valve means in response to temperature changes.

2. Apparatus according to claim 1 wherein said preheater further includes a fuel ignition element located in said chamber.

3. Apparatus according to claim 1 wherein said ignition element is an electrical resistance heating coil surrounding said sleeve.

References Cited

UNITED STATES PATENTS

| | | |
|---|---|---|
| 2,044,113 | 6/1936 | Woolson. |
| 2,229,714 | 11/1941 | Wirrer. |
| 2,856,543 | 10/1958 | Dixon et al. _____ 290—30 |
| 3,024,777 | 3/1962 | Baker _____ 123—122 |
| 3,093,126 | 6/1963 | Baker _____ 123—142.5 |
| 1,451,434 | 4/1923 | Roesch. |
| 3,338,226 | 8/1967 | Clark _____ 123—122 X |

AL LAWRENCE SMITH, *Primary Examiner.*